(12) United States Patent
Pernechele

(10) Patent No.: US 11,987,326 B2
(45) Date of Patent: May 21, 2024

(54) CONTAINER FOR LAUNCHING SONAR BUOYS

(71) Applicant: AEREA S.p.A., Turate (IT)

(72) Inventor: Luca Andrea Pernechele, Sesto San Giovanni (IT)

(73) Assignee: AEREA S.P.A., Turate (IT)

( * ) Notice: Subject to any disclaimer, the term of this patent is extended or adjusted under 35 U.S.C. 154(b) by 190 days.

(21) Appl. No.: 17/663,944

(22) Filed: May 18, 2022

(65) Prior Publication Data

US 2022/0371694 A1    Nov. 24, 2022

(30) Foreign Application Priority Data

May 21, 2021 (IT) .......................... 102021000013286

(51) Int. Cl.
*B63B 22/00* (2006.01)
*B64D 1/12* (2006.01)

(52) U.S. Cl.
CPC .............. *B63B 22/003* (2013.01); *B64D 1/12* (2013.01); *B63B 2022/006* (2013.01)

(58) Field of Classification Search
CPC ... B63B 22/003; B63B 2022/006; B64D 7/00; B64D 1/02; B64D 1/12; B64D 1/08; F41F 3/10
USPC .................................. 367/4; 124/56; 89/1.51
See application file for complete search history.

(56) References Cited

U.S. PATENT DOCUMENTS

| | | | | |
|---|---|---|---|---|
| 4,444,085 A | * | 4/1984 | Dragonuk | ................ B64D 1/04 89/1.51 |
| 5,054,364 A | * | 10/1991 | Dragonuk | ............. B63B 22/003 89/1.51 |
| 10,053,194 B1 | * | 8/2018 | Majewski | ................ F41B 11/72 |
| 2006/0213492 A1 | * | 9/2006 | Larcheveque | .......... F41B 11/00 124/71 |
| 2018/0304973 A1 | * | 10/2018 | Majewski | ................ B64D 1/02 |

FOREIGN PATENT DOCUMENTS

WO         02055949 A1     7/2002

OTHER PUBLICATIONS

Italian Search Report and Written Opinion dated Jan. 26, 2022.

* cited by examiner

*Primary Examiner* — Daniel L Murphy
*Assistant Examiner* — Amie M Ndure
(74) *Attorney, Agent, or Firm* — Heslin Rothenberg Farley & Mesiti P.C.; Victor A. Cardona, Esq

(57) ABSTRACT

A container for housing and launching sonar buoys of class G (sonobuoy) including a casing partitioned into two portions and automatic and simplified valve means to sequentially eject the buoys from the container.

6 Claims, 6 Drawing Sheets

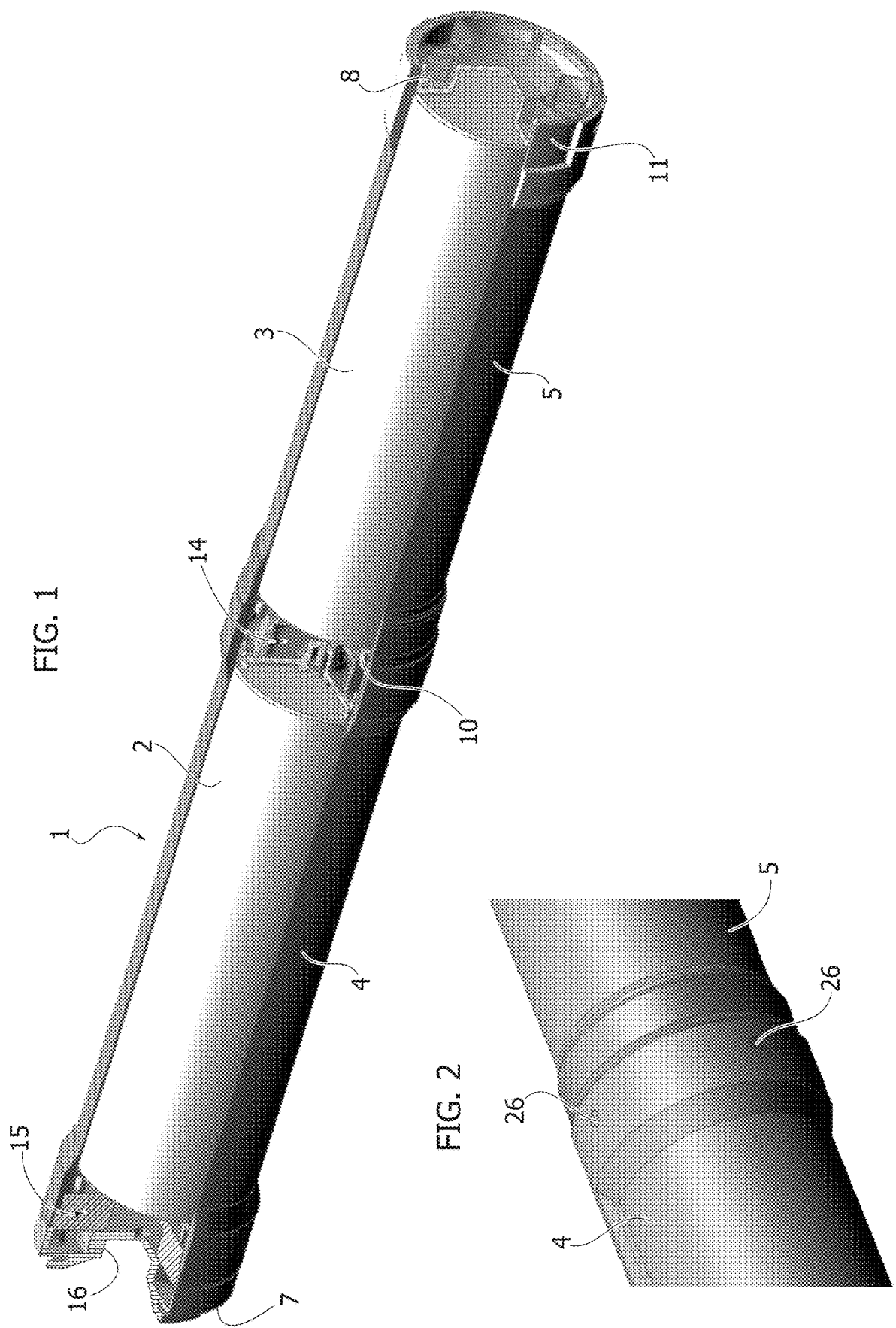

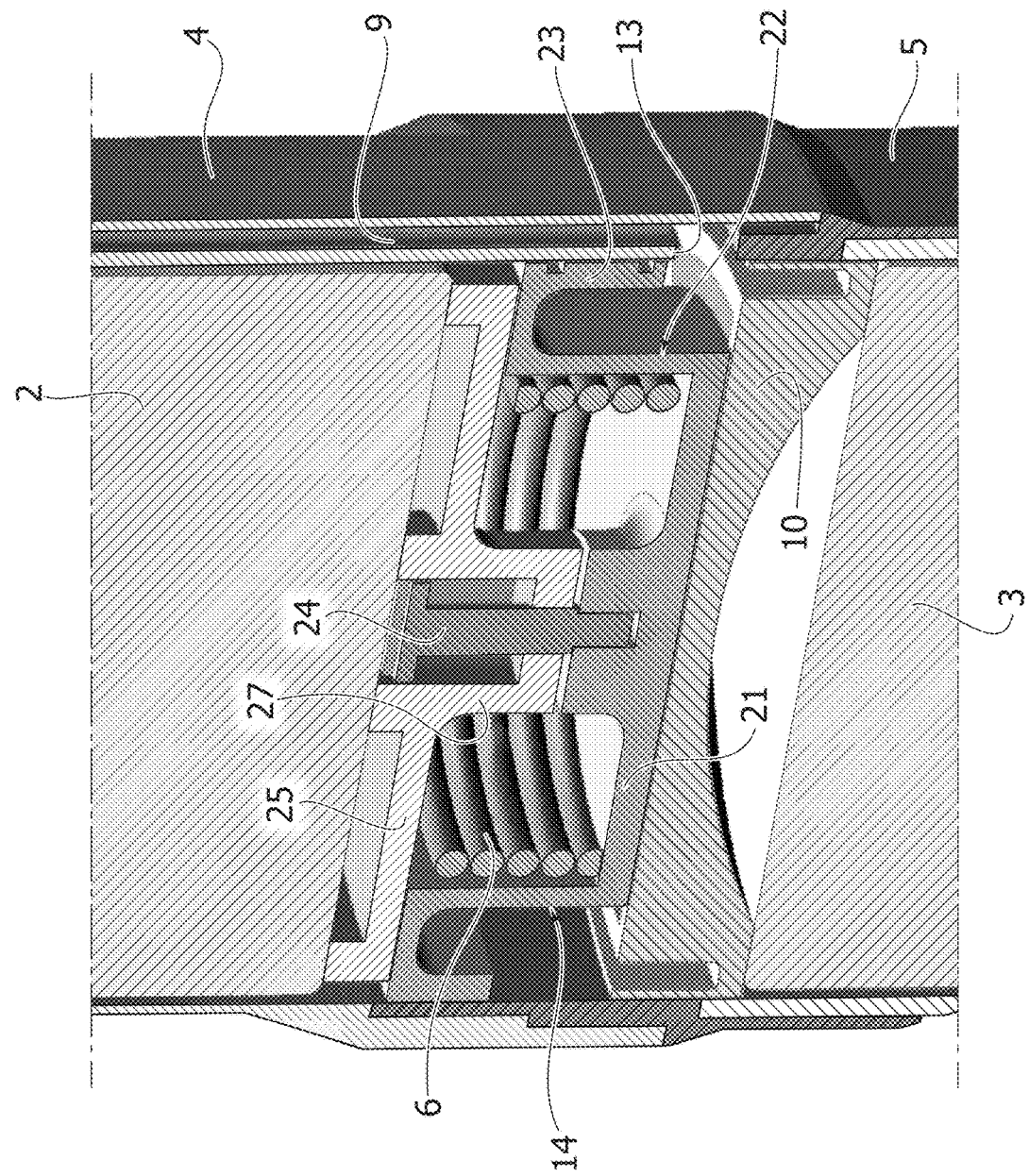

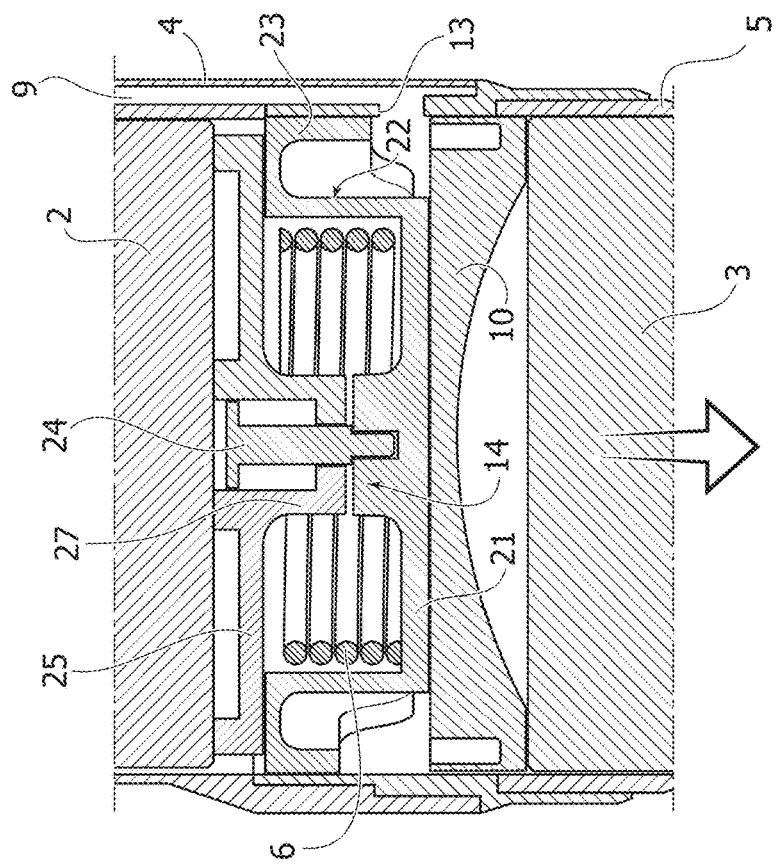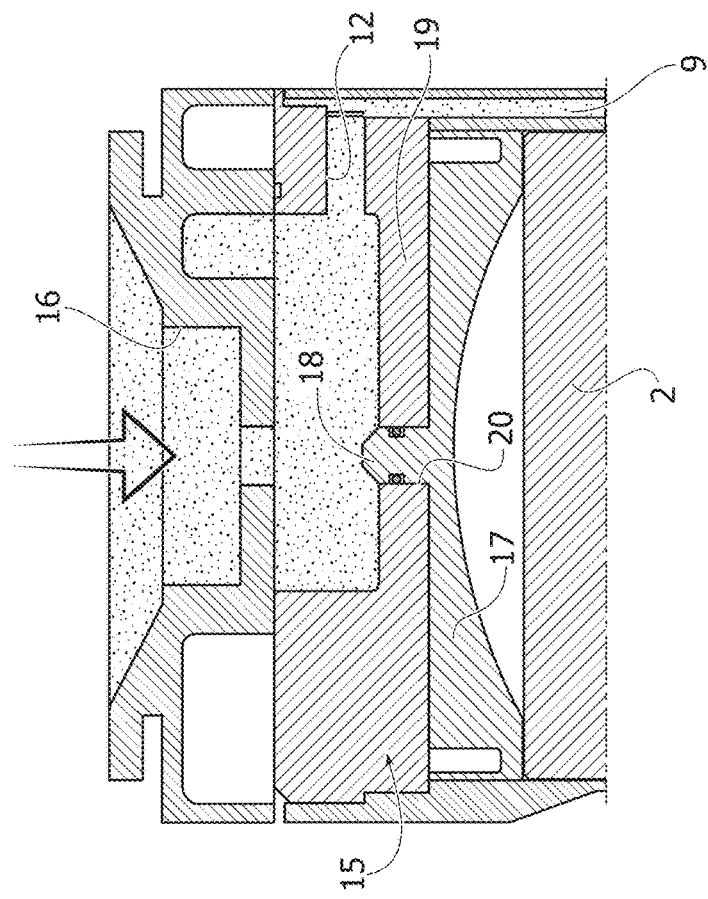

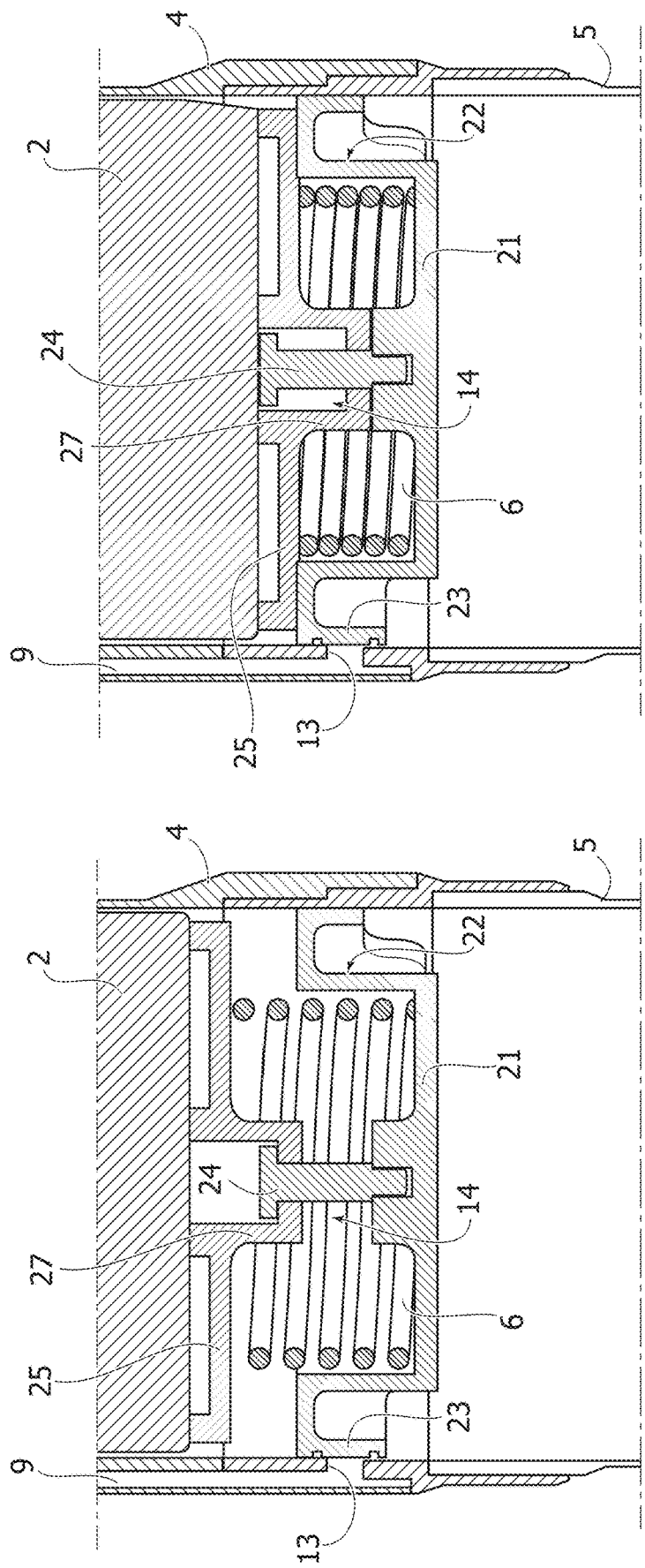

CONTAINER FOR LAUNCHING SONAR BUOYS

CROSS REFERENCE TO RELATED APPLICATIONS

This application claims priority from Italian Patent Application No. 102021000013286 filed on May 21, 2021, the entire disclosure of which is incorporated herein by reference.

FIELD OF THE INVENTION

The present invention relates to a container for housing and launching sonar buoys, so-called sonobuoy, and more particularly it relates to such a container designed to be installed in a launch tube provided with a pneumatic system.

STATE OF THE PRIOR ART

Sonar buoys are devices used for the identification—at sea—of submerged bodies, such as submarines, and for scientific purposes such as seafloor mapping and ocean thermal tracking. Currently, the most widely used model of sonar buoys is the Class A one. These buoys have a diameter of 124 mm and a length of 914 mm and they are conveniently supplied in a launch container, of the so-called SLC type. The buoy-container assembly is installed in a launch tube and the buoy is ejected under the command of the pilot and the on-board personnel by means of a pyrotechnic or pneumatic actuation.

These containers are normally disposable, they are made of polymer and they are provided with a standard mechanical interface so as to be installed in a launch tube, and a standard pneumatic interface so as to be connected to the pneumatic system of the launch tube.

Buoys from other classes have recently been developed, among which one of the most widely used, especially in Europe, is class G which has the same diameter as a buoy of class A and a length that is about half of the latter, i.e. 419 mm.

Therefore, there currently arises the problem of simplifying and making the operations of loading and programmed sequential launching of a pair of buoys of class G from a container designed to be installed in a launch tube provided with a pneumatic system more cost-effective.

Patent application EP3395683 A1 discloses a launch container including a cylindrical casing partitioned—by an internal intermediate cap—into two portions, each designed to contain a buoy of class G. This container is provided with a diverter that can be automatically switched from a first position in which it places the pneumatic system in communication with one of the aforementioned portions of the casing iso as to eject the buoy contained therein, to a second position, in which the pneumatic system is placed in communication with another portion of the casing so as to eject the second buoy. This diverter consists of a rotary disc mechanism comprising a base, a plunger, a rotary disc, a rotary spring, a rotary lid, an upper lid and central cavity provided with a plurality of annular openings. Despite being effective, this solution is complex and expensive to carry out and, considering the complexity thereof, it is difficult to inspect and therefore, potentially unreliable.

SUMMARY OF THE INVENTION

The object of the present invention is to overcome the aforementioned drawback.

With the aim of attaining such object, the invention relates to a container of the type defined in the preamble of claim 1, whose primary characteristic lies in the fact that the valve means include: a spring closing device provided with watertight sealing means so as to allow or cut off the communication between the pneumatic connection and the second portion of the casing, the spring closing device being provided between the first and the second buoy, and a diaphragm closing device for cutting off or allowing the communication between the pneumatic system and the first portion of the casing.

This allows to provide an automatically switchable airflow diverter that is simple, reliable and cost-effective to manufacture.

In a preferred embodiment of the invention, the spring closing device comprises a first movable plate provided with the aforementioned sealing means, and guide and stop means of the plate between a first axial position, wherein the sealing means allow the communication between the pneumatic connection and the second portion of the casing to eject the second buoy, and a second axial position, in which the sealing means cut off the communication between the pneumatic connection and the second portion of the casing.

In an embodiment according to the invention, the diaphragm closing device comprises a movable intermediate diaphragm on one side in contact with the first buoy and a shutter projecting from the opposite side, and a fixed plate carrying an air passage, in which the diaphragm is movable between a first axial position, in which the shutter is inserted inside the air passage cutting off the communication between the pneumatic system and the first portion of the casing, and a second axial position in which the shutter clears the air passage to eject the first buoy.

In an embodiment according to the invention, the spring closing device comprises a second plate movable with respect to the first movable plate between a first axial position in which it blocks the first buoy, by means of the thrust of a spring, in a first configuration of the buoy in which the shutter of the diaphragm closing device is inserted inside the air passage of the fixed plate, and a second axial position, in which it allows the displacement of the first buoy in a second configuration in which the shutter clears the air passage to eject the first buoy.

According to the invention, the aforementioned cylindrical casing conveniently comprises a plurality of breakable pins to keep the first buoy in the aforementioned second configuration.

According to a further aspect of the invention, the aforementioned pneumatic connection comprises at least one duct embedded in the side wall of the first portion of the container.

BRIEF DESCRIPTION OF THE DRAWINGS

Further characteristics of the invention will be apparent from the following detailed description, with reference to the attached drawings, provided purely by way of non-limiting example, wherein:

FIG. 1 is a schematic perspective view of an embodiment of the container according to the invention, FIGS. 2-4 illustrate, in perspective view, three different details of FIG. 1, and FIGS. 5-9 are schematic views which exemplify the operation of the container of sonar buoys according to the invention.

DETAILED DESCRIPTION OF THE INVENTION

Figure 3:
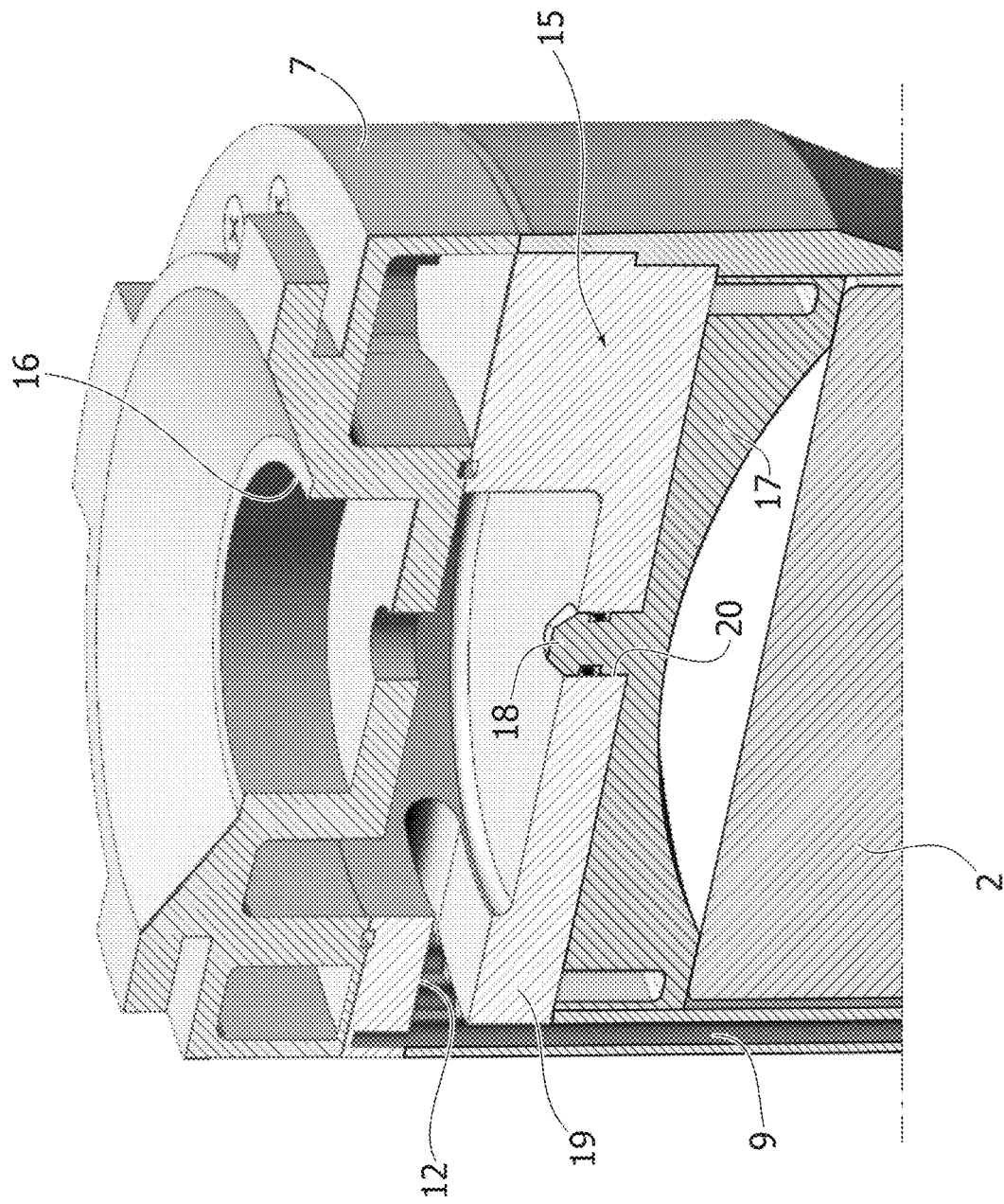

Initially with reference to FIG. 1, a container 1 for housing and launching sonar buoys of class G, and more particularly for launching a first buoy 2 and a second buoy 3 arranged coaxially inside the container 1 is indicated with 1.

Such container 1 is designed to be installed inside launch tubes, not shown since they are known to a man skilled in the art, typically used on helicopters and airplanes.

The container 1 comprises a cylindrical casing partitioned into two portions 4,5 and it has a proximal end 7 provided with an interface 16 with the pneumatic system of the launch tube and a distal end 8 on which a cap 11 is applied so as to seal the second portion 5 thereof.

Furthermore, the container 1 is provided with a first diaphragm 10 with watertight sealing which partitions it into two portions 4,5 each designed to contain a buoy of class G 2,3 and with a first 12 and with a second 9 pneumatic connection, visible in FIGS. 3 and 4, which connect the proximal end 7 with the second portion 5 of the casing through an air passage 13 provided for in a central section of the container 1.

With reference to FIGS. 3 and 4 described below are automatic valve means 14,15 provided to convey the air from the pneumatic system of the launch tube initially in the second portion 5 of the casing, to eject the second buoy 3, and subsequently in the first portion 4 of the casing, to eject the first buoy 2.

Conveniently, according to the invention, these valve means comprise a spring closing device 14 provided between the first 2 and the second 3 buoy configured to allow or cut off the communication between the pneumatic system and the second portion 5 of the container 1, and a diaphragm closing device 15, arranged between the first buoy 2 and the pneumatic system, to cut off or to allow the communication between the pneumatic system and the first portion of the casing 4.

With reference to FIG. 3, the diaphragm closing device 15 comprises a circular diaphragm 17 having a distal arch-shaped base in contact with the first buoy 2 and a flat proximal surface from which there axially projects a shutter 18, and a fixed circular plate 19 provided with a central air passage 20.

This diaphragm 17 is movable, as mentioned hereinafter, between a first axial position, in which the shutter 18 is inserted inside the air passage 20 cutting off the communication between the pneumatic system and the first portion of the casing 4, and a second axial position in which the shutter 18 clears the air passage 20 to eject the first buoy 2.

Now, with reference to FIG. 4, the spring closing device 4 comprises a first circular movable plate 21 from which there tangentially projects sealing means 22, 23 to cut off the communication between the pneumatic connection 9 and the second portion 5 of the casing. Such sealing means comprise a sheet-like body 22 including an end edge folded so as to form a wall 23 extending parallel to the pneumatic connection 9.

This first plate 21 is provided with guide and stop means 24,27 and it is movable between a first axial position, in which the folded end edge 23 of the sheet-like body 22 clears the air passage 13 allowing the communication between the pneumatic connection 9 and the second portion 5 of the casing to eject the second buoy 3, and a second axial position visible in FIG. 7, in which the folded end edge 23 is superimposed to the air passage 13 cutting off the communication between the pneumatic connection 9 and the second portion 5 of the casing.

The spring closing device 14 further comprises a second circular movable plate 25 for supporting the guide and stop means 24,27 of the first plate 21. The second movable plate 25 has a proximal surface in contact with the first buoy 2 and it is movable between a first axial position, in which it blocks the first buoy 2 in a first configuration by means of the thrust of a spring 6, and a second axial position, in which it allows the displacement of the first buoy 2 in a second configuration to be addressed hereinafter.

In the first configuration of the buoy 2, the shutter 18 of the diaphragm closing device 15 is inserted inside the air passage 20 of the fixed plate 25 occluding the communication between the pneumatic system and the first section 4 of the casing. In this manner, the air exiting from the pneumatic system is conveyed in the second portion 5 of the casing through the pneumatic connection 9 to eject the second buoy 3.

Subsequently, in order to eject the first buoy 2, the second movable plate 25 is displaced to the second position, as mentioned hereinafter, allowing the displacement of the first buoy 2 in the aforementioned second configuration, in which it is held by a plurality of breakable pins 26, visible in FIG. 2, circumferentially projecting from an internal central portion of the container 1, in which the shutter 18 clears the air passage 20 allowing the air to be conveyed in the first portion of the casing 4 to eject the first buoy 2.

With reference to FIGS. 5-9, below is the explanation on how the container 1 for housing and launching sonar buoys 2, 3 according to the invention operates.

FIG. 6 shows the spring closing device 14 in the configuration provided for when both buoys 2, 3, are housed in the container 1. In this configuration, the folded end edge 23 of the sheet-like body 22 of the sealing means is in a proximal position, so as to clear the air passage 13 between the pneumatic connection 9 and the second portion 5 of the casing.

With reference to FIG. 5, in order to eject the second buoy 3 from the container 1 one has to send a first pulse by means of the pneumatic system, the pressurised air enters, sequentially: in the pneumatic connection 12, in the pneumatic connection 9, in the air passage 13 to flow inside the second portion 5 of the casing pressurising it up to removing the second cap 11 and to eject the second buoy 3 from the container 1.

As observable in FIG. 7, when the air pulse terminates and the second buoy 3 is ejected, the first movable plate 21 is free to move and, thrust by a spring 6, it is arranged in the second position thereof in which the folded end edge 23 occludes the air passage 13 cutting off the communication between the pneumatic connection 9 and the second portion 5 of the casing.

Figure 9:
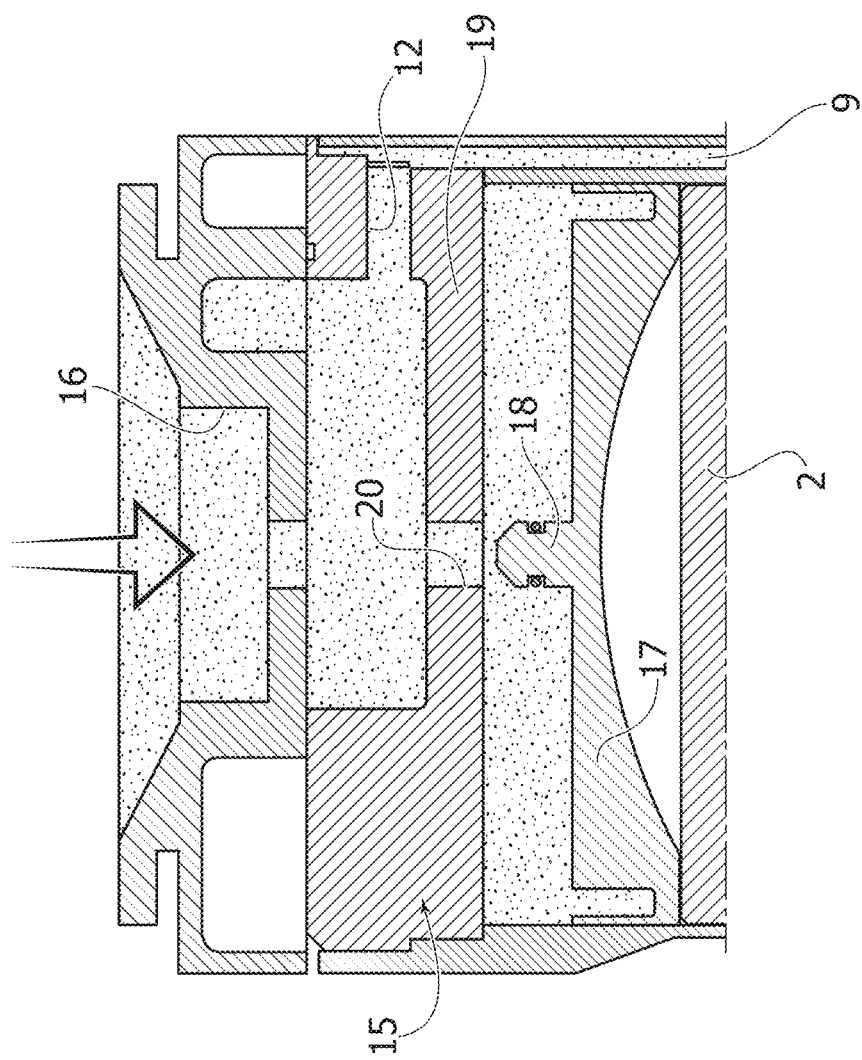

As observable in FIG. 9, at a successive pneumatic pulse of the system, the air converges into the pneumatic connection 9, it pressurises it given that the air passage 13 is now closed and, when the pressure which acts on the proximal end surface of the shutter 18 overcomes the preload force of the spring 6, the diaphragm 17 slides axially clearing the air passage 20. The air pressurises the portion of the casing cleared between the proximal surface of the circular diaphragm 17 and the fixed circular plate 19 determining the breaking of the breakable pins 26 and causing the ejection of the buoy 1.

Obviously, the construction details and the embodiments may widely vary with respect to what has been described and illustrated, without departing from the scope of protection of the present invention as defined in the claims that follow.

The invention claimed is:

1. Container for housing and launching sonar buoys (sonobuoy), designed to be installed in a launch tube provided with a pneumatic system, said container including:
   a cylindrical casing comprising a first portion designed to contain a first sonobuoy of class G, and a second portion designed to contain a second sonobuoy of class G,
   said cylindrical casing including:
      a proximal end provided with an interface with said pneumatic system of the launch tube,
      a watertight intermediate diaphragm for separating said first portion and said second portion of the casing from each other,
      a distal end provided with a cap for the watertight front closure of said second portion,
      a pneumatic connection between said proximal end and said second portion of the casing,
      valve means automatically switchable from a first configuration, in which said pneumatic system is placed in communication with said second portion of the casing by said pneumatic connection, so as to eject said cap and said second buoy from said container, to a second configuration, in which said pneumatic system is placed in communication with said first portion of the casing, so as to eject said first buoy, and
   said valve means comprising
      a spring closing device provided with watertight sealing means to allow or cut off the communication between said pneumatic connection and said second portion of the casing, and
      a diaphragm closing device, to cut off or allow the communication between said pneumatic system and said first portion of the casing, in which said diaphragm closing device is in contact with said first buoy.

2. Container according to claim 1, wherein said spring closing device comprises a first movable plate provided with said sealing means, and guide and stop means of said plate between a first axial position, in which said sealing means allow the communication between said pneumatic connection and said second portion of the casing so as to eject the second buoy, and a second axial position, in which said sealing means cut off the communication between said pneumatic connection and said second portion of the casing.

3. Container according to claim 1, wherein said diaphragm closing device comprises a movable diaphragm on one side in contact with said first buoy and a shutter projecting from the opposite side, and a fixed plate carrying an air passage, said diaphragm being movable between a first axial position, in which said shutter is inserted inside said air passage cutting off the communication between said pneumatic system and said first portion of the casing, and a second axial position in which said shutter clears said air passage to eject the first buoy.

4. Container according to claim 1, wherein said spring closing device comprises a second plate movable with respect to said first movable plate between a first axial position, in which said second plate blocks said first buoy by a thrust of a spring in a first configuration in which said shutter of said diaphragm closing device is inserted inside said air passage of the fixed plate, and a second axial position, in which said second plate allows the displacement of said first buoy in a second configuration in which said shutter clears said air passage to eject the first buoy.

5. Container according to claim 1, wherein said first portion of said cylindrical casing comprises a plurality of breakable pins for holding said first buoy in said second configuration.

6. Container according to claim 1, wherein said pneumatic connection comprises at least one duct embedded inside the side wall of the first portion of said container.

* * * * *